Nov. 25, 1969 W. F. LIST ET AL 3,480,780

RADIATION SENSITIVE SWITCHING SYSTEM FOR AN ARRAY OF ELEMENTS

Filed Sept. 28, 1966 2 Sheets-Sheet 1

INVENTORS
William F. List
and Marvin A. Schuster

BY R. Lewis Gable

ATTORNEY 3,480,780

RADIATION SENSITIVE SWITCHING SYSTEM FOR AN ARRAY OF ELEMENTS

William F. List, Linthicum, and Marvin A. Schuster, Baltimore, Md., assignors to Westinghouse Electric Corporation, Pittsburgh, Pa., a corporation of Pennsylvania Filed Sept. 28, 1966, Ser. No. 582,679
Int. Cl. H01j 39/12
U.S. Cl. 250—209 5 Claims

ABSTRACT OF THE DISCLOSURE

This invention relates to a system for electrically connecting each of a plurality of semiconductor elements disposed in an array in an external circuit. The semiconductor elements may be disposed in rows and column with a plurality of electrically conductive members aligned with the rows and the columns so as to connect each of the seimconductive devices in an XY matrix.

The invention described herein was made in the performance of work under an NASA contract and is subject to the provisions of Section 305 of the National Aeronautics and Space Act of 1958, Public Law 85–568 (72 Stat. 435; 42 U.S.C. 2457).

This invention relates to systems for sequentially switching a plurality of elements and in particular, to such systems which include semiconductive devices which are sensitive to radiation and which are connected in an XY matrix.

Illustratively an XY matrix may include $X_1$ to $X_N$ rows in which a first terminal of each of the semiconductive devices is connected to one of the conductive members. Further, a plurality of second conductive members are connected to a second terminal of each of the semiconductive devices and are disposed typically at right angles with each of the first conductive members to thereby form columns $Y_1$ to $Y_N$. The individual rows along which the semiconductive devices are interconnected must be isolated from each other, and the individual columns along with the second contacts of the semiconductive devices interconnected must likewise be isolated from each other. In addition, the conductive members disposed along the rows must be isolated from the conductive members disposed along the columns. Thus, when an external circuit is connected to a row X and a column Y, only element XY at the intersection of row X and column Y will be connected in the external circuit.

Further, it is normally desired that each of the semiconductive devices in the array be sequentially disposed in the external circuit. This may be accomplished in the following manner. First, one of the terminals of the external circuit is applied to row $X_1$, while the other terminal of the external circuit is applied to the conductive member of column $Y_1$ and then is sequentially connected in order to each of the conductive members of columns $Y_2$, $Y_3$ to $Y_N$. After the semiconductive devices of row $X_1$ have been pulsed or sensed, the terminal of the external circuit is then applied to the conductive member of row $X_2$, and the other terminal of the external circuit is applied sequentially in order to the conductive members of columns $Y_1$, $Y_2$, $Y_3$ to $Y_N$. In this fashion, one of the terminals of the external circuit is applied in order to the conductors of each of the rows $X_1$ through $X_N$ while the other terminal is being applied sequentially to the conductors of the columns $Y_1$ to $Y_N$. Thus, it may be seen that each of the semiconductive devices will be sequentially placed in the external circuit where their functional condition may be determined.

One important application of this invention relates to the use of photosensitive semiconductive devices which are disposed in an array to thereby sense and detect a radiation image. It is noted, however, that the teachings of this invention are applicable to the sequential readout of elements other than photosensitive devices and may illustratively include an array of other elements such as diodes in a logic matrix. In the particular application where it is desired to sense a radiation image, the single most important factor which determines the quality of the image is resolution. In turn, the resolution of a radiation image is directly dependent upon the number of discrete, photosensitive elements which may be incorporated in the array per unit length. Thus, in order to improve the resolution of a photosensitive array, it is essential to provide an array with a greater density of the photosensitive devices. In the present state of the art, arrays have been developed which contain 12,800 photosensitive devices arranged in 100 x 128 XY arrays with a resolution of approximately 200 lines per inch. In comparison, the radiation sensitive target members typically employed in vidicons and orthicon television camera tubes are easily capable of achieving a resolution of between 500 and 1000 lines per inch. Therefore, it is highly desirable to provide arrays of photosensitive semiconductive elements which are capable of achieving significantly higher resolutions than obtainable with the arrays of the prior art.

However, one of the primary limitations in achieving such resolution is the difficulty of connecting the external circuit to the conductors of the XY matrix. It may be understood that in order in connect the external circuit to each of the semiconductive devices, it is necessary to employ a commutation or switching circuit connected by wires to the conductive members of the matrix. Typically, one end of these wires is connected to the commutation circuit and the other end is bonded to the ends of the conductive members associated with the X rows and Y columns. However, the number of wires which may be bonded within a single unit of length is limited by the thickness of the wire at its bonded termination, the area of the conductive members required for bonding the wire and the area needed in which to perform the bonding operation. Further, the bonding of electrical wires is typically performed on a one by one (rather than on a continuous or batch) basis which is very expensive in terms of labor especially so in view of the number of wires which are needed. An additional difficulty resides in the bonding of a large number of wires, i.e., the required time temperature cycle can cause severe bond degradation and bond failure.

It is, therefore, an object of the present invention to provide a new and improved switching system for connecting an external circuit successively to each of a plurality of semiconductor elements disposed in an array.

Another object of this invention is to provide a new and improved switching system for connecting an external circuit to each of the electrically conductive members of an XY matrix of semiconductive elements.

A further object of this invention is to provide a new and improved switching system for connecting an external circuit successively to each of a plurality of semiconductive elements of an array whose density exceeds that achieved by systems and structures of the prior art.

A more specific object of this invention is to provide a new and improved switching system for connecting an external circuit to each of a plurality of semiconductor elements disposed in an XY matrix with a number of rows or columns exceeding 100 per inch.

It is a still further object of this invention to provide a switching system and structure capable of connecting an external circuit to each of a plurality of photosensitive semiconductive devices which are disposed in an array having a density of 160,000 elements per square inch or greater.

The present invention achieves the above-mentioned and additional objects and advantages by providing an improved switching system for disposing each of a plurality of devices in an external circuit. In accordance with the teachings of this invention, electrically conductive members are arranged so that a signal may be applied across the terminals of each of the devices. In turn, the conductive members are connected to a switching means which in accordance with the teachings of this invention includes a radiation sensitive switching means and a means for emitting a corresponding radiation to thereby activate the aforesaid switching means.

In one specific illustrative embodiment of this invention, the semiconductive devices are disposed in an XY matrix and the conductive members are brought out along the rows and columns of the matrix to a terminal of the radiation sensitive switching means. Further, another terminal of the swtiching means associated wtih both the columns and the rows of the matrix is connected to a common terminal conductor or bus. In order to actuate the radiation sensitive switching means, each of the radiation emitting means is energized sequentially to thereby select which row and column are to be connected respectively to the output conductors. Thus, in operation, appropriate circuit means are provided to sequentially energize the radiation emission means which in turn close the radiation sensitive switching means; as a result, each of the semiconductive devices are connected through the output terminals to the external circuit.

These and other objects and advantages of the present invention will become more apparent when considered in view of the following detailed description and drawings, in which.

Figures 1, 3:
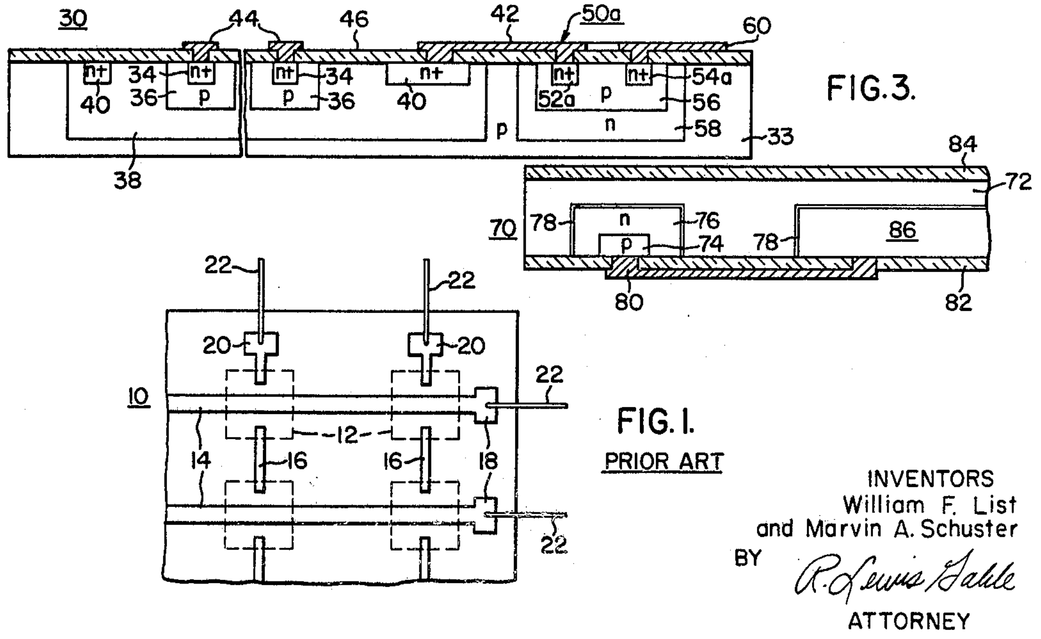
FIG. 3. FIG. 1. PRIOR ART
FIGURE 1 is a partial plan view of a mosaic of semiconductive devices in accordance with the prior art.
FIG. 3 is a section view taken along the line III—III of FIG. 2.

Referring now to the drawings, in particular to FIG. 1, a mosaic 10 is illustrated in accordance with the prior art wherein a plurality of photosensitive semiconductive devices 12 such as phototransistors are disposed in a two dimensional array. Connections to one portion of each of the photosensitive semiconductive devices 12 (i.e. an emitter region) are provided by a plurality of conductors 14 which are disposed as shown in FIG. 1 in a horizontal parallel relationship with each other. The end portions of the conductors 14 are provided with suitable pads 18 to which terminal wires 22 may be secured as by bonding. Further, suitable connections to another region of the semiconductive devices 12 (i.e. collector region) may be made by a plurality of conductors 16 which are disposed as shown in FIG. 1 in a vertical, parallel relationship with each other. In a similar manner, the end portions of the conductor 16 are provided with pads 20 to which the terminal wires 22 are connected. It will be understood that the semiconductive devices of the mosaic 10 be made by known epitaxial growth and selective planar diffusion techniques. As stated above, the principal problem to which this invention is directed is that of increasing the density of the semiconductive devices 12 and eliminating the need of bonding individual terminal wires 22 to each of the conductive members. As the density of the semiconductive elements 12 increases, the number of conductors 14 and 16 and the number of terminal wires are increased. However, there is a limit in the present art as to the number of terminal wires 22 which may be bonded to the pads in a given unit of length. It is particularly noted that as the area to which the terminal wires 22 may be bonded is decreased, that the ability of a worker to bond the wires 22 is decreased to the point where he is unable to manipulate the wire and the bonding equipment.

Figure 2:
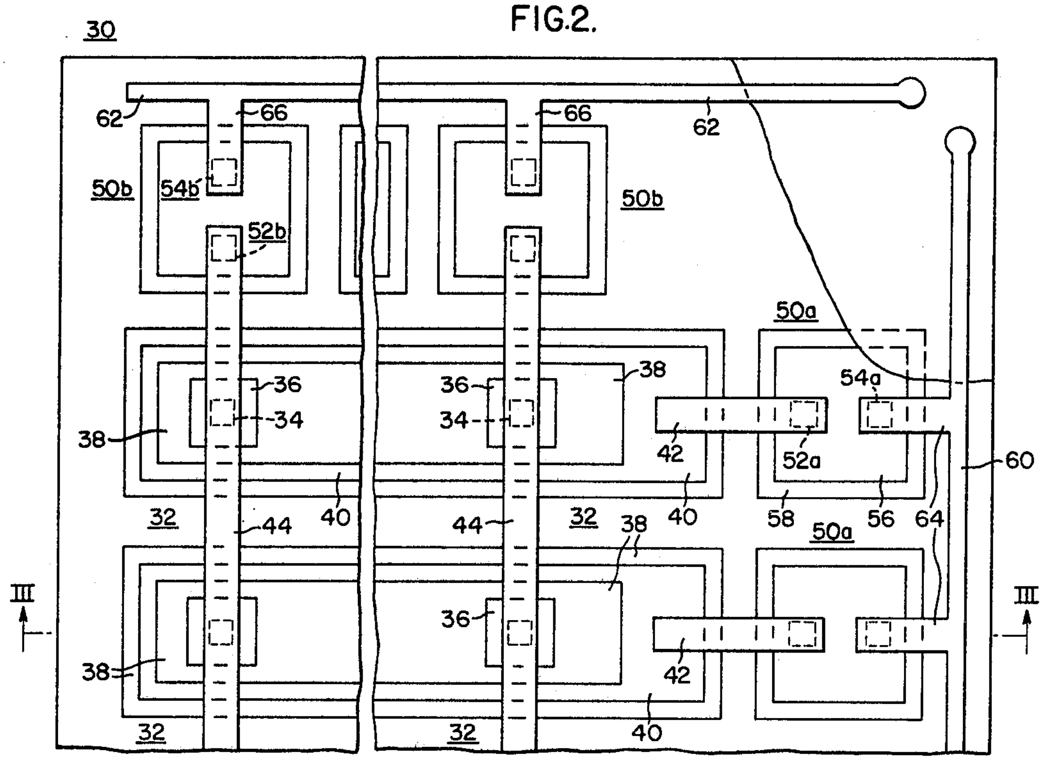
FIG. 2 is a partial plan view of an array of semiconductor devices including a switching means in accordance with the teachings of this invention.

Referring now to FIGS. 2 and 3, a mosaic 30 in accordance with the teachings of this invention is illustrated wherein a plurality of radiation sensitive semiconductive devices 32 are disposed in an XY matrix. Each radiation sensitive semiconductor device 32 has an emitter region 34, a base region 36, and a collector region 38. In an illustrative embodiment of this invention as presented in FIGS. 2 and 3, the emitter regions 34 and the collector regions 38 are of an n-type conductivity while the base regions 36 are of a p-type conductivity. Alternatively, it is noted that the emitter and collector regions could be made of a p-type material and the base regions could be made of an n-type material. The collector region 38 includes a contact region 40 the surface of which provides means for making ohmic contact to the collector region and which is more highly doped than the major portion of the collector region 38. It noted that the semiconductive regions of the structures described above may be made by known epitaxial growth and selective planar diffusion techniques in a substrate 33 which is illustratively of p-type conductivity.

As mentioned above, it is desired to connect each of the radiation sensitive semiconductive devices 32 to an external circuit which will be described in detail later. More specifically, electrical connections are provided between two common terminals or terminal buses 60 and 62 to which leads may be connected from the external circuit. In order to selectively connect each of the semiconductor devices 32 between the terminal buses 60 and 62, a plurality of radiation sensitive switching devices **50*a* and 50*b* are respectively provided to interconnect the terminal buses 60 and 62 to the appropriate rows and columns of the array of semiconductive devices 32. More specifically, the emitter regions 34 of each of the radiation sensitive semiconductor devices 32 are connected to an electrically conductive member 44 which may illustratively be a strip of vapor deposited aluminum as shown in FIG. 2 in a vertical direction. Further, the electrical conductors 44 are disposed parallel to each other and serve to connect the emitter regions 34 in a vertical column to the radiation sensitive switching means 50*b*. In order to connect the collector regions of each of the radiation sensitive semiconductive devices 32, the collector regions associated with each of the semiconductive devices 32 are formed as a common collector region 38 which is more clearly shown in FIG. 3. The common structure region, which is more fully described in the copending application to Schuster, List and Reinitz, entitled "Mosaic of Semiconductor Elements Interconnected in and XY Matrix," Ser. No. 534,340, and assigned to the assignee of this invention, provides an electrical connection for that portion of the collector region 38 associated with each of the semiconductive devices 32 to an electrical conductor 42 which is connected to the radiation sensitive switching means 50*a*. More specifically, the common colletcor region 38 is associated with the contact portion 40 upon which the electrical conductor 42 has been deposited. As clearly shown in FIG. 3, a layer 46 of a suitable insulating material such as silicon dioxide is disposed over the surface of the mosaic 30 in order to provide insulation between the various regions of the mosaic 30 and the electrical conductors 44 and 42. It is noted that the semiconductor device 32 is illustratively presented as a phototransistor, but that many other devices could be substituted therefor without deviating from the teachings of this invention. Illustratively, the radiation sensitive semiconductor devices 32** are phototransistors whose structures and operation are described in more detail in an article by J. P. Shive, Journal of the Optical Society of America, 1953, vol. 43, pp. 239 to 244.

In order to connect the collector region 38 and the emitter region 34 of the semiconductive device 32 respectively to the terminal buses 62 and 60, there is provided a plurality of the photosensitive switching means 50 which selectively interconnect the devices 32 to the aforementioned buses. Illustratively, the radiation sensitive switching devices 50 include first and second emitting regions 52 and 54, a base region 56 and a collector region 58. In one exemplary, specific embodiment of this invention as shown in FIGS. 2 and 3, the emitter regions 52 and 54, and collector regions 58 are made of an n-type conductivity material, whereas the base region 56 is illustratively made of a p-type conductivity although the opposite conductivities may be employed. Illustratively, the switching means 50 takes the form of a double emitter transistor device which has the basic symmetrical characteristic that an input signal may be applied to either emitter region with the output of the switch appearing at the other emitter. The structure of the switching means 50 is similar to that described in an abandoned application entitled "Semiconductor Switch Device," by Michael N. Giuliano and Elwood W. Goins, Ser. No. 176,723, and assigned to the assignee of this invention. Further, it has been found that the structure as described in the copending application to Giuliano and Goins may be adapted to be sensitive to particular radiation to thereby present a high conductivity between the emitting regions thereof.

Further, the horizontal rows as defined by the common collector regions 38 are connected to the radiation sensitive switching means 50*a* by the conductive members 42 which are connected between the contact regions 40 and the first emitter regions 52*a*. In turn, the second emitter regions 54*a* of the radiation sensitive switching means 50*a* are connected as by a conductive strip 64 to the terminal bus 60. The conductive members 44 forming the vertical columns connect the emiter regions 34 of each of the radiation sensitive semiconductive devices 32 to the first emitter regions 52*b* of the switching means 50*b*. In turn, a plurality of conductive strips 66 connect the second emitter regions 54*b* of the switching means 50*b* to the terminal bus 62.

In order to actuate the radiation sensitive switching devices 50, it is necessary to direct a radiation thereon of a wavelength to which the device 50 is sensitive. As shown in FIG. 3, there is provided a semiconductive device 70 which emits radiation of such a wavelength onto the radiation sensitive switching device 50*a*. It may be understood that there are a plurality of the radiation emitting semiconductive devices 70 each of which is associated with one of the switching devices 50. Illustratively, the gallium arsenide radiation emitting semiconductive device 70 may include a p-n junction as formed by a region 74 of p-type conductivity and a region 76 of n-type conductivity which have been formed by known epitaxial growth and/or selective diffusion techniques. The radiation emitting devices 70 may be embedded in a ceramic substrate 72, and illustratively secured therein by a potting compound 78. Electrical connection is made to the regions of the p-n junction of the radiation emitting semiconductive device 70 by an electrically conductive member 80 which is formed by vapor deposition upon a layer 82 of a suitable insulating material such as silicon dioxide to make contact respectively with the regions 74 and 76. It may not be necessary to provide individual connectors to the regions 76, since the regions 76 may form a common region disposed in a direction perpendicular to the illustration of FIG. 3. The conductive members 80 serve to connect the regions 74 to a pulsing circuit 86. Further, a layer 84 of a suitable optical material illustratively including 30% arsenic, 34% sulfur, and 36% thallium is inserted between the substrates 72 and 30 to minimize reflections of the emitted radiation at both the emitter and switch interfaces. As will be explained in greater detail later, a silicon commutating or pulsing circuit 86 may also be embedded in the ceramic substrate 72 by a potting compound 78 to provide a series of pulses whereby a voltage may be placed across the p-n junction to thereby emit radiation of an appropriate wavelength. The radiation emitting devices may illustratively be made of gallium arsenide and the commutating circuit 86 may be made of silicon. Alternatively, both the radiation emitting devices 70 and the commutating circuit 86 may be made of the same material, i.e. gallium arsenide or silicon; in this case, the substrate 72 would likewise be made of this material and the potting material could be eliminated.

One specific illustrative embodiment of the mosaic 30 could be formed by using a starting material to make the substrate 33 of about 10 ohm-centimeter p-type silicon on which an epitaxial layer of 1 ohm-centimeter n-type silicon having a thickness of about 20 microns was grown and corresponding to the common collector region 38. A diffusion for forming an isolation wall between the regions 38 and 58 could be performed by using an acceptor impurity to a sheet resistivity of about 5 ohms per square. The base regions 36 and 56 could be formed by diffusion of an acceptor impurity to its sheet resistivity of about 165 ohms per square and a thickness of about 3 microns. Next, the emitter regions 34, 52 and 54 could be diffused by simultaneously using an n-type impurity to a sheet resistance of about 2 ohms per square and a thickness of about 2 microns. In one illustrative embodiment, the substrate 72 may be made of a ceramic material into which the gallium arsenide light emitting devices 70 and the silicon commutating circuits 86 are embedded with one of the commercially available epoxy or potting compounds 78. The gallium arsenide light emitting devices 70 may be fabricated by diffusing zinc to a surface concentration of $10^{18}$ to $10^{19}$ atoms/cm.$^3$ and to a depth of approximately 25 micrometers to form the p-type regions 74 into the n-type gallium arsenide region 76. Further, the regions 74 may be doped with silicon impurities to a level of $10^{16}$ to $10^{17}$ atoms/cm.$^3$. These processes may be carried out by either planar diffusion techniques or by diffusion and mesa etching techniques. The silicon commutating circuits may be fabricated by standard epitaxial and planar diffusion techniques such as those described with respect to the manufacture of the mosaic 30. The electrically conductive members 80 between the radiation emitting devices 70 and the commutating circuits 86 may be made by either bonded lead or vapor deposition techniques. Many variations of this structure are possible and the above description represents only one illustrative embodiment of this invention.

Figure 4:
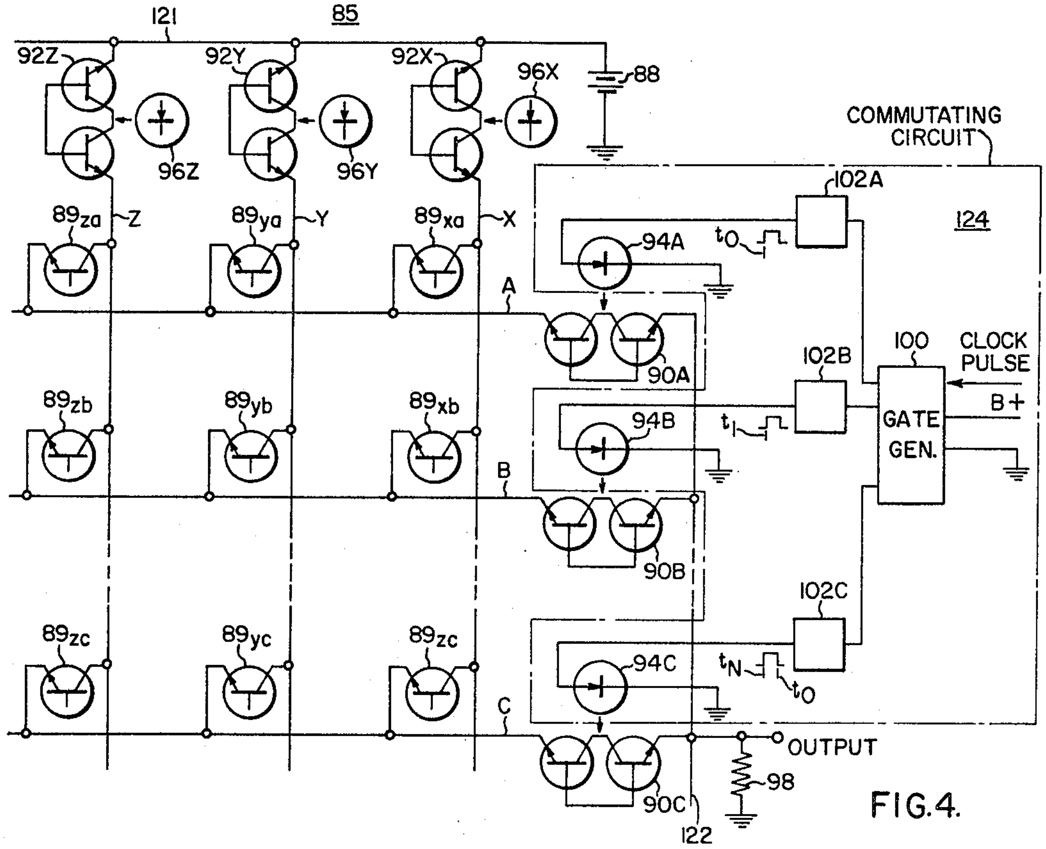
FIG. 4 is a schematic representation of the array of semiconductor elements and the switching system as shown in FIGS. 2 and 3.

Referring now to FIG. 4, the operation of the switching system in accordance with the teachings of this invention will be explained. A switching system 85 in accordance with the teachings of this invention includes a plurality of radiation sensitive devices 89 which may illustratively take the form of photosensitive transistors, a plurality of suitable radiation sensitive switching devices 90 and 92 such as double emitter, photosensitive transistors, a plurality of suitable radiation emitting devices 94 and 96 such as a radiation emitting diode, and suitable circuit means for sequentially pulsing the radiation emitting devices. More specifically, the radiation sensitive devices 89 are disposed in an array with their collector regions connected to a plurality of conductive members X, Y, Z, etc. and their emitter regions connected to a plurality of conductive members A, B, C, etc. to form an XY matrix. The X, Y, Z conductive members are respectively connected to the radiation sensitive switching devices 92X, 92Y and 92Z respectively. In turn, the other terminal of each of the switching devices 92 is each connected by a terminal bus 121 through a potential source 88 to ground. Further, the conductive members A, B, C are connected respectively to the radiation sensitive switching devices 90A, 90B, 90C. In turn, the other terminal of each of the switching devices 90 is connected to the terminal bus 122 which is, in turn, connected across a load impedance 98 to provide an output signal. Further, the radiation emitting devices 94A, 94B, 94C, etc. are respectively disposed to direct radiation onto the radiation sensitive switching devices 90A, 90B, 90C, etc. to thereby switch these devices to a conductive condition. In a similar manner, the radiation emitting devices 96X, 96Y, 96Z, etc. are respectively disposed to direct radiation onto the sensitive switching devices 92X, 92Y, 92Z, etc.

In order to provide a series of pulses to sequentially energize the radiation emitting devices 94A, 94B, 94C, etc., a pulsing or commutating circuit 124 is provided. Illustratively, the commutating circuit includes a gate generator 100 of a type well known in the art to which is applied a positive potential (B+). Illustratively, the gate generator 110 may be built in accordance with principles discussed in chapters 9 and 10, pp. 309 to 395 of Yaohon Chu's Digital Computer Design Fundamentals, #1962. Functionally, the gate generator provides a series of pulses which are applied sequentially to a plurality of pulse amplifiers 102A, 102B and 102C respectively at times $t_0$, $t_1$ and $t_2$. Further, a clock pulse is applied to the gate generator 100 to reset this circuit so that a new set of pulses may be applied to the pulse amplifiers. Illustratively, the pulse amplifier may be of the emitter-follower type. The amplifiers 102 in turn apply the amplified pulses through the radiation emitting devices 94A, 94B and 94C to ground. As a result, each of the radiation emitting devices 94A, 94B and 94C are sequentially pulsed to thereby emit light which is directed onto the radiation responsive switching devices 94A, 94B and 94C. Further, it may be understood that a similar pulsing circuit would be provided to sequentially pulse the radiation emissive devices 96X, 96Y, and 96Z to thereby render the switching devices 92X, 92Y, 92Z in a conductive condition.

In an illustrative mode of operation, the radiation emitting device 94A would be pulsed to thereby direct radiation onto the radiation responsive switching device 90A to thereby render this device conductive. In a similar fashion, the radiation emissive device 96X would also be pulsed to thereby render the switching device 92X conductive. As a result, the conductors A and X are thereby connected to the terminal buses 122 and 121 respectively to thereby impress the voltage source 88 across the phototransistor $89_{xa}$. In the particular embodiment in which the semiconductive devices 89 are radiation sensitive, a radiation image would be focused by a suitable lens system onto this array of elements. Basically, the radiation image is directed onto the base portion of the phototransistor wherein there is generated electron hole pairs. If the electrons are liberated within a diffusion length of the depletion region around the collector junction, these electrons will diffuse to this depletion region and be swept across the junction where they account for a small component of the photocurrent. Similarly, the holes which are created with a diffusion length of the emitter junction will diffuse to this region where they forward bias the emitters and so induce injection of minority carriers into the base. This latter phenomenon accounts for substantial transistor photocurrent. Thus, the impedance between the emitter and collector regions is substantially proportional to the incident radiation directed on each of the devices 89. When the radiation sensitive semiconductive device $89_{xa}$ is connected between the terminal buses 121 and 122, the source 88 of potential will be applied through the device $89_{xa}$ and the load impedance 89 to ground. Therefore, the output potential derived across the output impedance 98 is a function of the impedance of the semiconductive device $89_{xa}$ and, in turn, the radiation directed thereon.

Next, the radiation emitting device 96Y would be pulsed to thereby render the switching device 92Y conductive and to thereby sense as described above the radiation directed upon the radiation sensitive semiconductor device $89_{ya}$. In a similar manner, each of the photosensitive semiconductor devices 89 which are connected to the conductive member A would be sensed. Next, the radiation emitting member 94A is de-energized and the radiation emissive member 94B is energized to thereby render the switching device 90B conductive. Next, the radiation responsive semiconductive members would be sequentially sensed in a manner as described above until each of these members which are connected to conductor B have been sensed. In a like fashion, each of the switching devices 90 would be rendered conductive to thereby sequentially sense each of the photosensitive semiconductive devices which are connected to the particular conductor which is associated with that switching means. In this manner, each of the photosensitive semiconductive devices 89 will be sensed and a corresponding voltage will be established across the load impedance 98.

Figure 6:
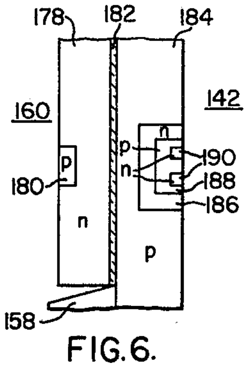
FIG. 6 is a cross ectional view of the first and second assemblies as taken along the line VI—VI of FIG. 5.
Figure 5:
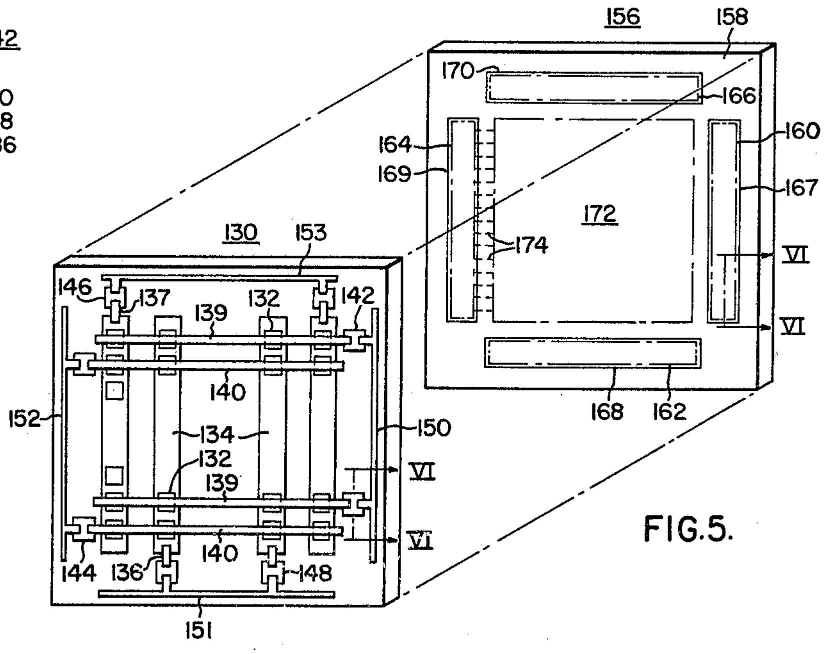
FIG. 5 is an orthogonal view of the assembly of two substrates in accordance with the teachings of another embodiment of this invention.

Referring now to FIGS. 5 and 6, a further embodiment of the switching system of this invention is shown which includes a first assembly 130 having a plurality of photosensitive devices 132 formed on a silicon monolith in a manner similar to that described with regard to FIGS. 2 and 3 and arranged in an XY matrix. The horizontal rows may be formed by a plurality of conductive strips 139 and 140 which are connected to a terminal region of each of the photosensitive semiconductive devices 132. In order to increase the density of the photosensitive semiconductive devices 132, two terminal buses 150 and 152 are associated with the horizontal rows of photosensitive semiconductive devices 132. More specifically, the electrically conductive strips 139 are connected through a plurality of radiation sensitive switching devices 142 to the terminal bus 150. In a similar fashion, the conductive strips 140 are connected through a plurality of radiation sensitive switching devices 144 to the terminal bus 152 which is disposed upon the left-hand side of the first assembly 130 as seen in FIG. 5. As shown with respect to the switching system of FIGS. 2 and 3, the connection to the other terminal of the radiation sensitive semiconductor device 132 is made through a common collector region 134. As shown in FIG. 5, the vertical columns are formed by a plurality of common collector regions 134 which made electrical contact to each of the photosensitive devices 132. Further, electrical contact is made to a terminal bus 153 through a plurality of radiation sensitive switching devices 146 by a conductive strip 137. In a similar fashion the alternate collector regions 134 are interconnected by conductive strips 136 through a plurality of radiation sensitive semiconductive devices 148 to a terminal bus 151.

In order to sequentially render the radiation responsive switching devices 142, 144, 146 and 148 conductive, there is provided a second assembly 156 illustratively including a ceramic base 158 made of suitable material such as quartz and having a plurality of openings 167, 168, 169 and 170 for receiving respectively in a secure fit arrays 160, 162, 164 and 166 of radiation emitting devices. Illustratively, each of the arrays of radiation emitting devices may be formed of a substrate 178 of semiconductive material. Illustratively, the radiation emitting devices may be diodes formed between the substrata 178 and a plurality of regions 180 of p-type semiconductive material. It has been found that the radiation of gallium arsenide diodes may be efficiently generated and that silicon photosensitive switches as described above with regard to FIGS. 2 and 3 are particularly responsive to the radiation emitted therefrom. Therefore, it would be desirable in one embodiment of this invention to incorporate an array of gallium arsenide devices for emitting and directing radiation onto the photosensitive switching devices of the first assembly 130. Further, the arrays 160, 162, 164 and 166 are disposed so that the radiation emitted by each of the radiation emissive devices is respectively directed upon the four sets of switching devices composed of elements such as 142, 144, 146 and 148. As shown in FIG. 6, the radiation emitting device formed by the regions 180 and 178 directs its radiation onto the radiation sensitive switching device such as elements 142. Illustratively, the switching device is a double emitter semiconductive device as described with respect to FIGS. 2 and 3, and includes two emitter regions 190 of n-type semiconductive material, a base region 188 of p-type semiconductive material, and a collector region 186 of an n-type semiconductive material. The switching devices 142 may illustratively be fabricated by methods well known in the art on a substrata 184 of p-type semiconductive material. An optical coating 182 is disposed between the substratas 184 and 178 to ensure that the radiation generated by the diodes of the array 160 is not diffracted as it leaves or enters a body of semiconductive material. Illustratively, this layer would be a glass composed of 30% arsenic, 36% thallium and 39% sulfur. This and other suitable materials are further described in a copending application entitled "Electrohyperoptical Device Having Improved Coupling," Ser. No. 542,650, by Edgar L. Irwin, and assigned to the assignor of this invention.

Further, there is provided a pulsing circuit 172 which may be formed upon a semiconductor monolith and supported by the ceramic base 158. Appropriate connections between the pulsing circuit 172 and the gallium arsenide diodes of the arrays may be effected by wire conductors 174 which may be bonded to appropriate terminals of the pulsing circuit 172 and to the conductors associated with the diodes of the arrays 160, 162, 164 and 166. Alternatively, these interconnections may be effected by means of vapor deposited leads.

Since numerous changes may be made in the above described apparatus and different embodiments of the invention may be made without departing from the spirit thereof, it is intended that all matter contained in the foregoing description or shown in the accompanying drawings, shall be interpreted as illustrative and not in a limiting sense.

We claim as our invention:

1. A switching circuit comprising: a first substrate member, an array of radiation sensitive semiconductive devices located on said first substrate, said array of said semiconductive devices disposed in a plurality of columns and a plurality of rows transverse to said columns, each of said semiconductive devices having a first electrode and a second electrode, a first radiation sensitive switching means including a plurality of discrete first devices each associated with one column of said radiation sensitive semiconductive devices, a second radiation sensitive switching means including a plurality of discrete second devices each associated with a row of said radiation sensitive semiconductive devices, each switching device having a first and second terminal, a plurality of first and second electrically conductive paths located on said first substrate, each of said first conducting paths interconnecting the first electrodes of a column of said semiconductive devices to the first terminal of the radiation sensitive switching device associated with said column, each of said second conducting paths interconnecting the second electrodes of a row of said semiconductive devices to the first terminal of the radiation sensitive switching devices associated with said row, said first and second electrically conductive paths being electrically isolated from each other, a first and second conductive member located on said first substrate, said first conductive member interconnecting the second electrodes of said first radiation sensitive switching means, said second conductive member interconnecting the second electrode of said second radiation sensitive switching means, said first and second conductive members being electrically isolated so that each of said radiation sensitive switching devices may be connected sequentially to an external circuit associated with said first and second terminal members; a second substrate member, a plurality of discrete semiconductor light emitters located on said second substrate, each of said light emitters corresponding to one of said discrete radiation sensitive switching devices of said first substrate, said second substrate positioned with respect to said first substrate so as to align corresponding semiconductor light emitters and radiation sensitive switching devices, and means for sequentially energizing said semiconductor light emitters to render various of said first and second radiation sensitive switching means conductive to insert a desired sequence of each of said radiation sensitive semiconductive devices in the external circuit.

2. A switching circuit as claimed in claim 1, wherein each of said radiation sensitive semiconductive devices is a phototransistor in which said first and second electrodes represent emitter and collector regions.

3. A switching circuit as claimed in claim 1, wherein said radiation sensitive switching means include a plurality of double emitter transistor devices including first and second emitter regions, a base region and a collector region.

4. A switching circuit as claimed in claim 1, wherein said radiation sensitive switching device and semiconductor light emitters are made of silicon.

5. A switching circuit as claimed in claim 1, wherein said radiation sensitive switching means include a plurality of semiconductive devices made of silicon, and said semiconductor light emitters are made of gallium arsenide.

References Cited

UNITED STATES PATENTS

| | | | |
|---|---|---|---|
| 3,108,189 | 10/1963 | Bowerman | 250—213 X |
| 3,183,360 | 5/1965 | Van Santen | 250—208 |
| 3,271,576 | 9/1956 | Turner | 250—209 X |
| 3,378,688 | 4/1968 | Kabell | 250—211 |
| 3,388,255 | 6/1968 | May | 250—211 |

WALTER STOLWEIN, Primary Examiner

U.S. Cl. X.R.

250—217; 317—235